United States Patent [19]

Arai

[11] Patent Number: 5,049,997
[45] Date of Patent: Sep. 17, 1991

[54] VIDEO CAMERA EXPOSURE CONTROL METHOD AND APPARATUS FOR PREVENTING IMPROPER EXPOSURE DUE TO CHANGING OBJECT SIZE OR DISPLACEMENT AND LUMINANCE DIFFERENCE BETWEEN THE OBJECT AND BACKGROUND

[75] Inventor: Fumihito Arai, Tokyo, Japan
[73] Assignee: Fuji Photo Film Co., Ltd., Kanagawa, Japan
[21] Appl. No.: 505,368
[22] Filed: Apr. 6, 1990

[30] Foreign Application Priority Data

Apr. 10, 1989 [JP] Japan .................................. 1-89923
Apr. 10, 1989 [JP] Japan .................................. 1-89924
Apr. 14, 1989 [JP] Japan .................................. 1-94744

[51] Int. Cl.⁵ ........................ H04N 3/14; H04N 5/335
[52] U.S. Cl. .............................. 358/213.11; 358/228; 358/209; 358/213.19
[58] Field of Search .......... 358/228, 209, 909, 213.19, 358/213.24, 213.26, 213.31, 213.11, 213.13, 225; 382/52

[56] References Cited

U.S. PATENT DOCUMENTS 4,695,894 9/1987 Saito et al. ........................ 358/228
4,829,382 5/1989 Hess et al. ......................... 358/228

FOREIGN PATENT DOCUMENTS 0342708 11/1989 European Pat. Off.
61-230476 10/1986 Japan.
62-203141 9/1987 Japan.
62-219778 9/1987 Japan.
1236780 9/1989 Japan.
2219461 6/1989 United Kingdom.

Primary Examiner—James J. Groody
Assistant Examiner—Tuan V. Ho

[57] ABSTRACT

A photometry of a scene divided into a plurality of areas is carried out by using an image area sensor of a video camera. An average luminance value of each area is calculated, and the luminance distribution is estimated on the basis of the average luminance value and a threshold value to thereby discriminate the type of scene. A calculation equation prepared for each type of scene is selected to calculate a luminance value of the scene by using at least one of the average luminance values. The light amount incident to the image area sensor is adjusted in accordance with the scene luminance value. If a scene is divided into a central area and a peripheral area, the scene is discriminated as a rear light scene or a spot light scene on condition that the average luminance value of each area is equal to or larger than a threshold value. For the rear light scene, using as a reference value a median between average luminance values of two areas, luminance values smaller than the reference value are selected for the calculation of the scene luminance value. For the spot light scene, luminance values larger than the median are selected for the calculation of the scene luminance value. In order to eliminate the influence of white or black clothes, very high or low luminance components are clipped. A higher clip level is used for clipping the high luminance components for the spot light scene. The threshold values to be used for a scene discrimination are determined by a preceding scene discrimination result.

16 Claims, 10 Drawing Sheets

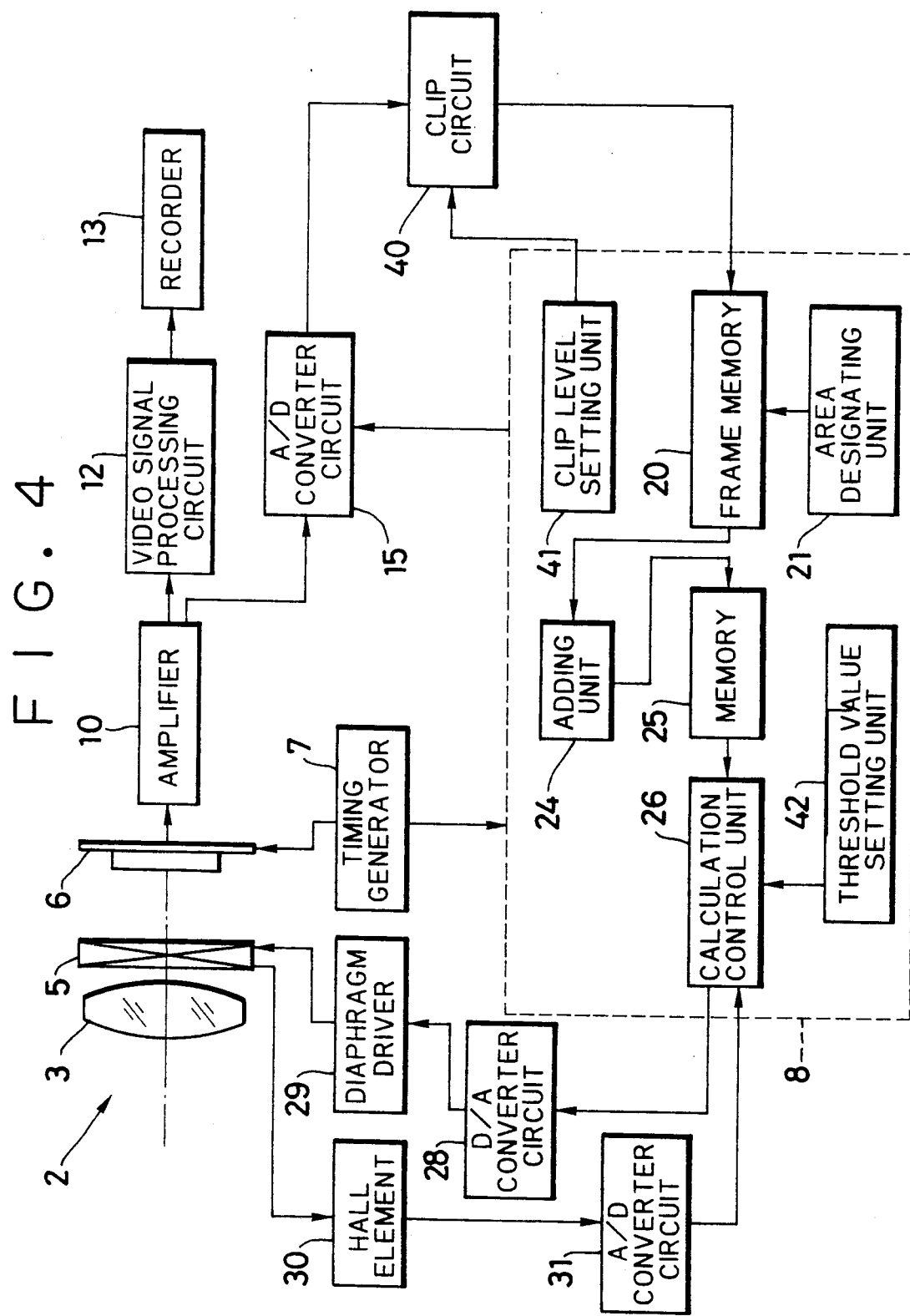

F I G. 6
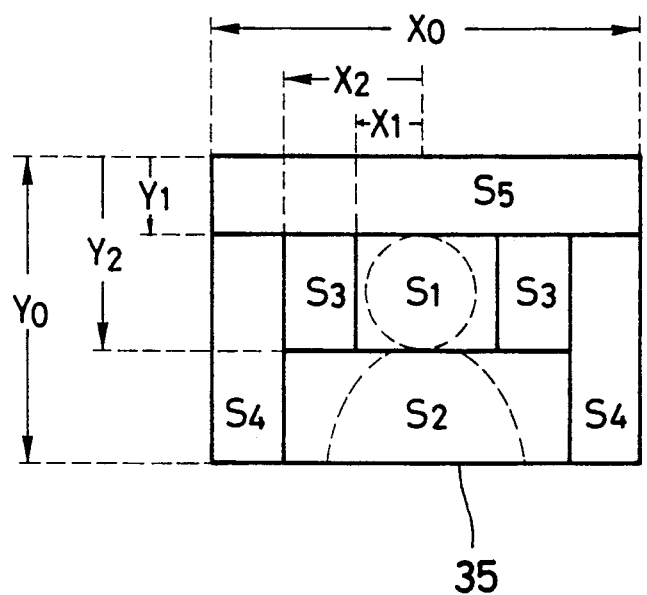

VIDEO CAMERA EXPOSURE CONTROL METHOD AND APPARATUS FOR PREVENTING IMPROPER EXPOSURE DUE TO CHANGING OBJECT SIZE OR DISPLACEMENT AND LUMINANCE DIFFERENCE BETWEEN THE OBJECT AND BACKGROUND

BACKGROUND OF THE INVENTION

1. Field of the Invention

The present invention relates to an exposure control method and apparatus for use with video cameras, and more particularly to an exposure control method and apparatus wherein photometry is carried out by using a video signal outputted from an image area sensor which picks up scene images.

2. Description of the Background Art

As an exposure control method for a camera, there is known a method as disclosed in Japanese Patent Laid-open Publication No. 62-203141. According to this method, an image frame is divided into a central area and a plurality of concentric peripheral areas surrounding the central area, and the size of a main object in the image frame is estimated on the basis of the distance to the main object, such as a person, and the focal length of the taking lens. If the main object has a size substantially equal to the central area, an exposure correction amount is obtained using the outputs from the central area and peripheral areas. The exposure correction amount, added to a value center-weighted averaged over all light readings obtained through weighted addition of photometric values at respective areas, is used as an exposure value according to which the exposure control is carried out. This exposure control method obtains the exposure correction amount in accordance with the relationship between a main object and the luminance of the background thereof. It is therefore possible to obtain a proper exposure even for a rear light scene or the like.

The above conventional exposure control method, however, is associated with a problem that if a main object is located displaced from the center of the image frame, the influence of background luminance becomes significant so that a proper exposure control cannot be attained precisely. Further, with this exposure control method, a proper exposure cannot be obtained of the face of a person wearing clothes such as white or black, of which the reflective index is largely different from that of the face. Still further, in the case of a rear light scene and in the case of a spot light scene with a main object spot-lighted, it is difficult to obtain a proper exposure control of a face of person. Furthermore, if the size of a main object changes frequently in respective scenes due to motion of the main object, the exposure correction amount changes at corresponding frequency, resulting in an unnatural exposure control.

SUMMARY OF THE INVENTION

It is therefore a principal object of this invention to provide an exposure control method and apparatus capable of a precise exposure control even if a main object is displaced more or less from the center of an image frame or even if the size of the main object is indefinite over consecutive scenes.

It is another object of the present invention to provide an exposure control method and apparatus capable of a proper exposure control for a face of a person without being influenced by the luminance of clothes.

It is a further object of the present invention to provide an exposure control method and apparatus capable of a proper exposure control for a rear light scene and a spot light scene.

It is a still further object of the present invention to provide an exposure control method and apparatus capable of stable and natural exposure control while preventing the exposure adjustment from being changed frequently.

In order to achieve the above and other objects, and advantages of the present invention, an image frame is divided into a plurality of areas. A scene is discriminated by comparing the average luminance value of each area with a threshold value. A calculation equation is selected in accordance with the discriminated scene to calculate a scene luminance value and exposure control is performed using the calculated scene luminance value to thereby obtain a proper luminance of a face of a person.

According to a preferred embodiment of this invention, the image frame is divided into a central area and a peripheral area. The difference between the average luminance values of the two areas is used for the discrimination among a normal scene, rear light scene, and spot light scene. If the average luminance value difference between the central area and peripheral area is smaller than a predetermined value, then the scene is determined as a normal scene, and the average luminance value of pixels within the central area or within the whole area is used as the scene luminance value. If the average luminance value of the peripheral area is higher than that of the central area and the luminance difference therebetween is equal to or larger than a predetermined value, then the scene is determined as a rear light scene, and the average luminance value of pixels having a luminance level smaller than the median between the two average luminance values, is used as the scene luminance value. On the other hand, if the average luminance value of the peripheral area is lower than that of the central area and if the luminance difference therebetween is equal to or larger than the predetermined value, then the scene is determined as a spot light scene, and the average luminance value of pixels having a luminance level larger than the median between the two average luminance values, is used as the scene luminance value.

According to another embodiment of this invention, the threshold values are set in accordance with the type of scene discriminated at the preceding photometry operation. Differences in average luminance values of respective areas are compared with the threshold values to discriminate a scene. In accordance with the discriminated scene, the scene luminance value is calculated for performing exposure adjustment.

According to a further embodiment of this invention, the high luminance components are clipped using a first lower clip level and a second higher clip level. In discriminating a scene and calculating the scene luminance value, the luminance data processed by the first clip level are used. For the spot light scene, the luminance data processed by the second clip level are used to calculate the scene luminance value.

According to the present invention, the average luminance value at each area is compared with a threshold value to discriminate a scene, and the scene luminance value is calculated by a calculation equation provided for each scene. Therefore, even if a main object is displaced from the central area of the image frame or even if the main object person wears white or black clothes, the face of the person is controlled to obtain a proper luminance. Further, for the case of a rear light scene and a spot light scene, the clip level at the high luminance components is changed, or pixels are selectively used in calculating the average luminance value. Accordingly, a proper exposure control can be attained for a rear light scene and spot light scene. Further, the threshold value is selected in accordance with the scene discriminated at the preceding photometry operation, so that the exposure control will not fluctuate unnecessarily to thereby allow a stable and natural exposure control.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and advantages of this invention will become apparent from the following detailed description when read in connection with the accompanying drawings which are given by way of illustration only and are thus not limitative of the present invention, in which:

FIG. 4 is a block diagram showing the outline of a video camera according to a second embodiment of this invention;

FIG. 6 illustrates an example of divisional photometry;

DETAILED DESCRIPTION OF THE INVENTION

Figure 1:
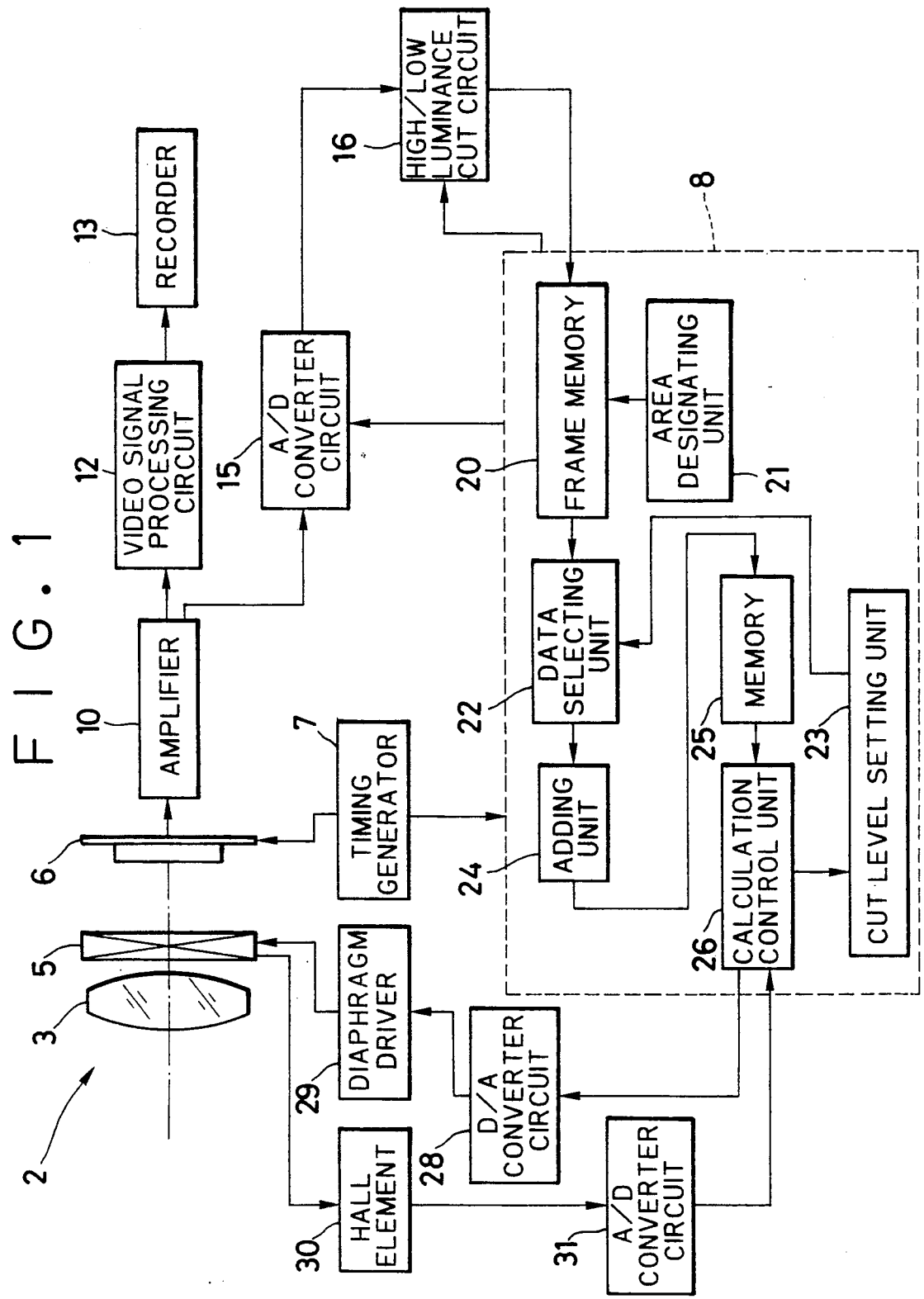
FIG. 1 is a block diagram illustrating a video camera according to a first embodiment of this invention.

Referring to FIG. 1, a video camera 2 has a taking lens 3 and an iris diaphragm 5 disposed behind the lens 3. The iris diaphragm 5 regulates the light amount from the lens 3 in accordance with a luminance value of a scene so that a video image displayed on a display unit such as a CRT has a proper luminance. The regulated light is incident to an image area sensor 6 such as a CCD (charge coupled device) positioned at the focal plane of the lens 3. The CCD 6 is driven in response to clock pulses from a timing generator 7 which is connected to a microcomputer 8 to provide synchronism between the CCD 6 and the microcomputer 8. The microcomputer 8, which is shown in FIG. 1 in functional blocks, sequentially controls respective circuit portions of the video camera in accordance with built-in programs as well known in the art. An amplifier 10 connected to the CCD 6 samples and holds a video signal from the CCD 6 at a predetermined sampling frequency (e.g., 3.58 MHz) and amplifies it.

A video signal outputted from the amplifier 10 is converted into an NTSC signal at a video signal processing circuit 12. This NTSC signal is recorded in a recording medium such as a video tape by a recorder 13. The video signal outputted from the amplifier 10 is also supplied to an A/D converter circuit 15 in order to use it for the adjustment of light amount. If a color CCD is used, a green color signal is derived from the amplifier 10 as a luminance signal. In the following description, the luminance signal is assumed to be derived from the amplifier 10. The A/D converter circuit 15 converts the luminance signal into a digital signal. The digital signal is supplied to a high/low luminance cut circuit 16 which cuts off the high and low luminance signal components to extract the luminance data having the luminance range of an object in general to be imaged. The extracted luminance data are sent to the microcomputer 8. The cut-off high and low luminance signal components are, e.g., high luminance data over 100 IRE (Institute of Radio Engineers) Scale Unit and low luminance data under 3 IRE.

Figure 2:
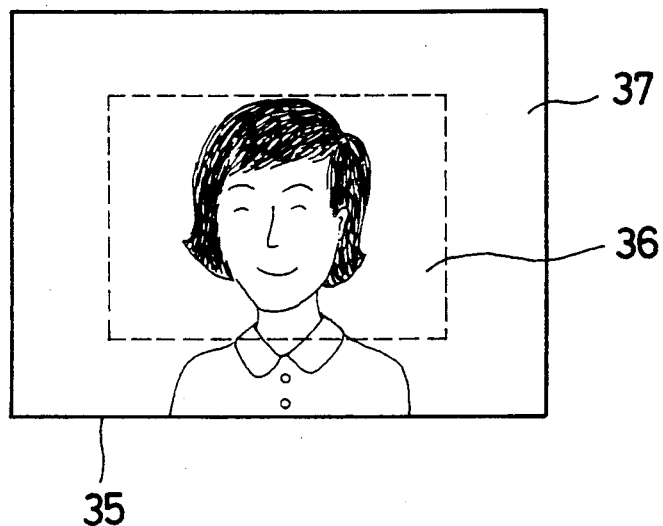
FIG. 2 illustrates an example of divisional photometry.

The luminance data corresponding to one frame are written in a frame memory 20 of the microcomputer 8. As shown in FIG. 2, an image frame 35 is divided into a central area 36 and a peripheral area 37. An area designating unit 23 designates an area to be read. The luminance data for respective pixels within the designated area are sequentially read from the frame memory 20, and sent to a data selecting unit 22. This data selecting unit 22 picks up the luminance data having a level equal to or higher than a cut level set by a cut level setting unit 23, or the luminance data having a level equal to or lower than the cut level. The picked-up luminance data are sent to an adding unit 24 which adds together the luminance data for the area 36 and for the area 37 to thereby calculate average luminance values $B_1$ and $B_2$, respectively, which are then written in a memory 25. In the following description, an exposure value (EV) with a film of ISO 100 is used as the luminance value.

A calculation control unit 26 compares the difference between the average luminance values $B_1$ and $B_2$ read from the memory 25 with a predetermined threshold value T (e.g., 1 EV). If $|B_1 - B_2| < T$, then $B_1$ is used as a scene luminance value. On the contrary if $|B_1 - B_2| \geq T$, then a median $P_1$ between $B_1$ and $B_2$ is calculated and sent to the cut level setting unit 23. At this time the cut level setting unit 23 sets $P_1$ as the cut level to be used by the data selecting unit 22.

The calculation control unit 26 determines the diaphragm diameter in accordance with the calculated scene luminance value, and sends a corresponding diaphragm diameter signal to a diaphragm driver 29 via a D/A converter circuit 28. The driver 29 adjusts the diameter of the iris diaphragm 5. A Hall element 30 is mounted on the iris diaphragm 5 for the detection of the diaphragm diameter. An output signal from the Hall element 30 is converted at an A/D converter circuit 31 into a digital signal which is then sent to the calculation control unit 26 for the feedback control of the iris diaphragm 5.

Figure 3:
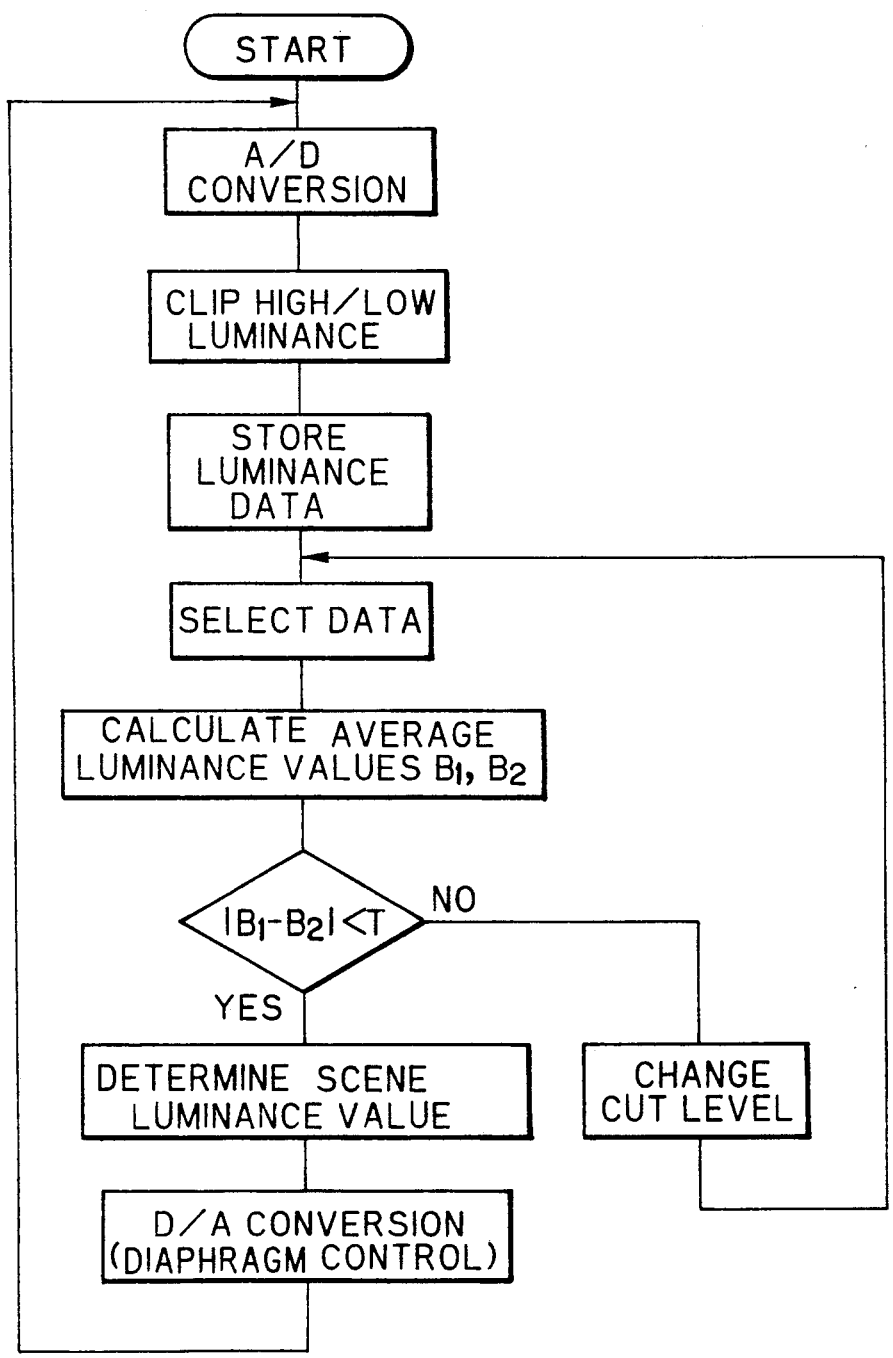
FIG. 3 is a flow chart illustrating the photometry procedure for the video camera shown in FIG. 1.

The operation of the embodiment constructed as above will be described with reference to FIG. 3. First, a video tape cassette is loaded in the video camera 2 and electric power is supplied to thereby allow image pickup of an object from the taking lens 3. The object light passed through the taking lens 3 is incident to the CCD 6 via the iris diaphragm 5, and is converted into an electric signal. A video signal is read from the CCD 6 in response to clock pulses from the timing generator 7, and sent to the amplifier 10. The video signal inputted to the amplifier 10 is sampled and held at the predetermined sampling frequency, and the resultant signal is sent to both the video signal processing circuit 12 and the A/D converter circuit 15.

The A/D converter circuit 15 converts the inputted luminance signal into luminance data which are sent to the high/low luminance cut circuit 16. The high/low luminance cut circuit 16 removes high luminance components above a white level and low luminance components under a black level, and the resultant luminance signal is then sent to the microcomputer 8. The microcomputer 8 writes the luminance data corresponding to pixels of one frame into the frame memory 20. Next, the central area 36 is designated by the area designating unit 21 to read out the luminance data of the pixels included in the central area 36. The luminance data for all the pixels are added together at the adding unit 24 to obtain an average luminance value $B_1$ which is then written in the memory 25. Similarly, the luminance data for all pixels included in the peripheral area 37 are read to obtain an average luminance value $B_2$ which is then written in the memory 25.

The calculation control unit 26 obtains the difference between the average luminance values $B_1$ and $B_2$ for the central and peripheral areas 36 and 37, respectively, and compares the luminance difference with the predetermined threshold value T. If $|B_1 - B_2| < T$, it means that the luminance distribution of the image frame is substantially flat over the whole area so that it is judged that the object is not a rear light scene nor a spot light scene. In this case, the main object is assumed to be present in the central area 36, and the average luminance value $B_1$ is used as the scene luminance value.

If $B_2 - B_1 \geq T$, it is judged that the object is a rear light scene and that the main object is generally dark. The median $P_1$ between the average luminance values $B_1$ and $B_2$ is calculated and sent to the cut level setting unit 23. The cut level setting unit 23 sets the median $P_1$ as the cut level for the selection of the luminance data at the data selecting unit 22.

After setting the cut level, the luminance data are again read from the frame memory 20 for the respective areas to obtain the average luminance values at the adding unit 24. In this case, of the luminance data read from the frame memory 20, the data selection unit 22 selects only the luminance data having a level equal to or lower than $P_1$. The selected luminance data are added together at the adding unit 24 to obtain the average luminance values which are supplied to the calculation control unit 26. The obtained average luminance values are assumed to be $B_1'$ and $B_2'$. The calculation control unit 26 compares the luminance difference between $B_1'$ and $B_2'$ with the threshold value T. If $|B_1' - B_2'| < T$, then $B_1'$ is used as the scene luminance value. If $|B_1' - B_2'| \geq T$, then the cut level is changed again. The average luminance values are obtained using the new cut level, and they are checked with respect to the above-described conditional formulas. The above operations are repeated until $|B_1' - B_2'| < T$ is satisfied.

If $B_1 - B_2 \geq T$, it is judged that the object is a spot light scene and the main object is bright. In this case, the median $P_1$ between the average luminance values $B_1$ and $B_2$ is calculated and sent to the cut level setting unit 23. The cut level setting unit 23 sets $P_1$ as the cut level for the selection of luminance data at the data selecting unit 22. Of the luminance data written in the memory 20, the data selecting unit 22 selects only the luminance data having a level higher than $P_1$.

The selected luminance data are added together at the adding unit 24 to obtain the average luminance values $B_1'$ and $B_2'$. The calculation control unit 26 compares the luminance difference between $B_1'$ and $B_2'$ with the threshold value T. If $|B_1' - B_2'| \geq T$, similar operations as above are repeated. If $|B_1' - B_2'| < T$, the average luminance value $B_1'$ is used as the scene luminance value.

After calculating the scene luminance value, the microcomputer 8 drives the diaphragm driver 29 via the D/A converter circuit 28, in accordance with the calculated scene luminance value, to thereby adjust the diameter of the iris diaphragm 5. The diameter of the iris diaphragm 5 is measured with the Hall element 30 and sent to the microcomputer 8 via the A/D converter circuit 31. By means of feedback control, the microcomputer 8 automatically controls to set the diameter of the iris diaphragm 5 to the diameter satisfying the scene luminance value. In the above manner, the diameter of the iris diaphragm 5 is controlled while tracking the object luminance so that a proper light amount is incident to the CCD 6. As well known, the video signal outputted from the CCD 6 is converted into an NTSC signal by the video signal processing circuit 12 and recorded on the video tape by the recorder 13.

In the above embodiment, the luminance data in the central area 36 are used in calculating the scene luminance value. Instead, an average value of luminance data of the whole image frame (central area 36 and peripheral area 37) may also be used. Further, in the above embodiment, if it is judged that the object is a rear light scene or a spot light scene with only the main object spot-lighted, the cut level is changed in accordance with the average luminance values $B_1$ and $B_2$. Instead, a cut level may be previously determined for each scene (rear light scene, spot light scene and normal scene). In such a case, the luminance data for one frame outputted from the high/low luminance cut circuit 16 are processed at each corresponding cut level, and written in the frame memory dedicated to that scene. The luminance data for each cut level are read from each frame memory to calculate average luminance values which are checked as to whether the above-described conditional formula are satisfied. With such an arrangement, the time required for changing the cut level is omitted, thereby shortening the calculation time of a scene luminance value.

Figure 5:
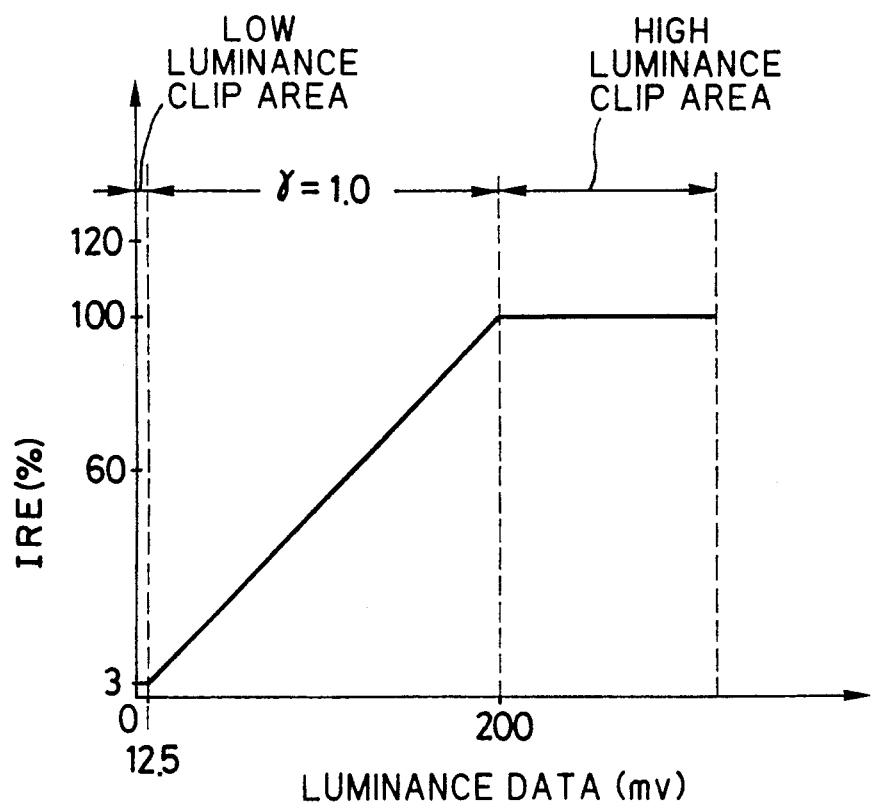
FIG. 5 is a graph illustrating a clipping process.

FIG. 4 is a schematic block diagram illustrating a second embodiment of this invention, wherein substantially the same elements as those shown in FIG. 1 are represented by identical reference numerals, and the description therefor is omitted. A clip circuit 40 is connected to the A/D converter circuit 15. This clip circuit 40 clips the high and low luminance components of the luminance data, by using clip levels set by a clip level setting unit 41. An example of clipping is shown in FIG. 5. In this clipping process, the high luminance components e.g. equal to or larger than 200 mV are set to 100 IRE, and the low luminance components e.g. equal to or lower than 12.5 mV are set to 3 IRE. In FIG. 5, an input signal is represented by mV unit, and a clipped output signal is represented by IRE scale unit. The luminance data smaller than 12.5 mV is clipped to 12.5 mV, and the data larger than 200 mV is clipped to 200 mV.

As shown in FIG. 6, in the second embodiment, the image frame 35 is divided into five areas $S_1$ to $S_5$. Representing the horizontal lengths by $X_1$, $X_2$, and $X_0$ and the vertical lengths by $Y_1$, $Y_2$ and $Y_0$, the sizes of the areas $S_1$ to $S_4$ are defined by way of example as in the following:

$$0.076 \leq X_1/x_0 \leq 0.305$$

$$0.305 \leq X_2/x_0 \leq 0.437$$

$$0.110 \leq Y_1/Y_0 \leq 0.368$$

$$0.522 \leq Y_2/Y_0 \leq 0.772$$

The area designating unit 21 sequentially designates the areas $S_1$ to $S_4$ so that the luminance data of pixels included in the designated area are read. It seldom occurs that the main object is located within the area $S_5$, so this area is not used in discriminating a scene. The adding unit 24 adds together the luminance data of pixels within each area $S_1$ to $S_4$ to thereby calculate average luminance values $B_1$ to $B_4$, and an average luminance value $B_{ijk}$ (i, j, k = 1 to 4) for a combination of a plurality of areas. The calculation control unit 26 compares the average luminance values $B_1$ to $B_4$ and $B_{ijk}$ to conduct a scene discrimination, and selects one out of calculation equations (1) to (7) corresponding to the discriminated scene to thereby calculate a scene luminance value $C_i$ (i is a number of the calculation equation) for proper light amount. The examples of the calculation equations (1) to (7) are shown below. Also in this embodiment, an EV value is used as an average luminance value.

1. calculation equation (1)

$C_1 = B_{123}$ 2. calculation equation (2)

$C_2 = (B_1W_1 + B_2W_2 + B_3)/(W_1 + W_2 + 1)$ 3. calculation equation (3)

$C_3 = (B_{12}W_3 + B_3 + B_4)/(W_3 + 2)$ 4. calculation equation (4)

$C_4 = (B_{13}W_4 + B_2W_5 + B_4)/(W_4 + W_5 + 1)$ 5. calculation equation (5)

$C_5 = (B_{134}W_6 + B_2)/(W_6 + 1)$ 6. calculation equation (6)

$C_6 = (B_{123}W_7 + B_2)/(W_7 + 1)$ 7. calculation equation (7)

$C_7 = B_{1234}$

In the above equations, $W_1$ to $W_7$ are weighting coefficients which take the following values by way of example:

$W_1 = 10, W_2 = 1, W_3 = 10, W_4 = 10, W_5 = 1, W_6 = 10, W_7 = 10$

A threshold value setting unit 42 sets threshold values $Th_0$ to $Th_3$ to be used in a scene discrimination, the threshold value being determined in accordance with the type of the calculation equation used for calculating the preceding scene luminance value $C_i$.

Figure 7:
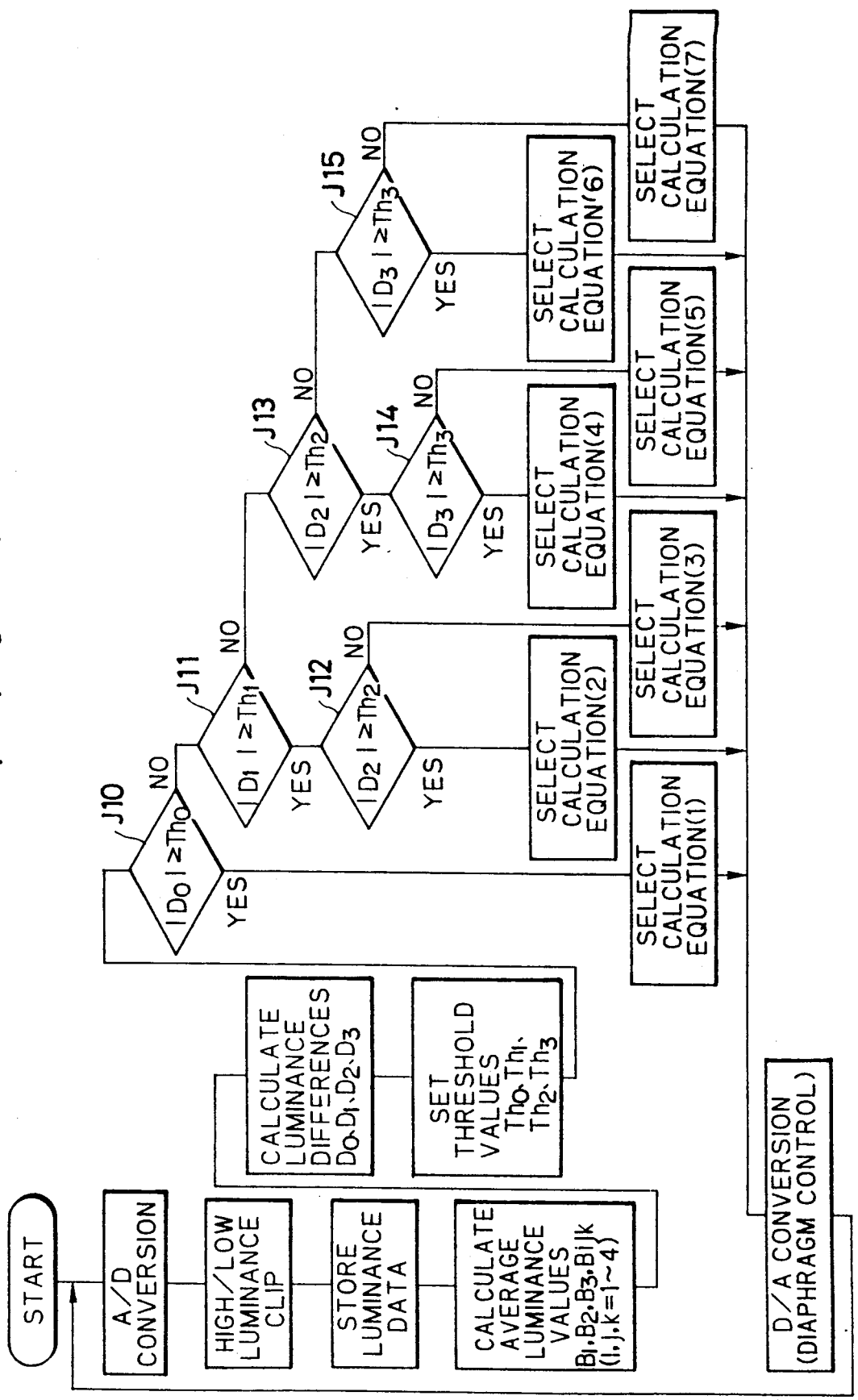
FIG. 7 is a flow chart illustrating the photometry procedure according to the second embodiment.

Calculating the scene luminance value in accordance with the second embodiment will be described with reference to FIGS. 7 and 8. The luminance data inputted to the clip circuit 40 are clipped with respect to their high and low luminance components, and written in the frame memory 20. Next, the luminance data for each area $S_1$ to $S_4$ are read to calculate at the adding unit 24 the average luminance values $B_1$ to $B_4$ for respective areas. Also calculated is the average luminance value $B_{ijk}$ (i, j, k = 1 to 4) for the combination of a plurality of the areas $S_1$ to $S_4$. These average luminance values are written in the memory 25.

The calculation control unit 26 reads the average luminance values for respective areas from the memory 25 and calculates the luminance differences between two of the combined or component areas. The target value Ref of the luminance level of the image frame is set to an output of 60 IRE (gamma = 4.5 series) for example. The luminance difference $D_0$ between the target value Ref and the average luminance value $B_{123}$ of the area $S_{123}$ which is a combination of the areas $S_1$, $S_2$ and $S_3$, is given as in the following, where the base of log is a natural logarithm "e":

$D_0 = \log(B_{123}/\text{Ref})/\log 2$

The luminance difference $D_1$ between the areas $S_1$ and $S_3$ is given by:

$D_1 = \log(B_1/B_3)/\log 2$

Similarly, the luminance difference $D_2$ between the areas $S_1$ and $S_2$ is given by:

$D_2 = \log(B_1/B_2)/\log 2$

The luminance difference $D_3$ between the average luminance value $B_{13}$ for the area $S_{13}$ composed of the areas $S_1$ and $S_3$ and the average luminance value $B_4$ for the area $S_4$ is given by:

$D_3 = \log(B_{13}/B_4)/\log 2$

The calculation control unit 26 reads the threshold values $Th_0$ to $Th_3$ from the threshold setting unit 42. The read threshold values are compared with the absolute values $|D_0|$ to $|D_3|$ of the luminance differences $D_0$ to $D_3$ to thereby discriminate an object scene and select one of the calculation equations (1) to (7) suitable for the discriminated scene.

The luminance differences $D_0$ to $D_3$ change slightly with even a small motion of the main object, noises or the like. The calculation equation to be selected, therefore, changes frequently, causing a problem of a fluctuation of the exposure control. In order to avoid this, the threshold values $Th_0$ to $Th_3$ are selected in accordance with the previously selected one of the calculation equations (1) to (7). The relationship between the previously selected calculation equation and the threshold values $Th_0$ to $Th_3$ to be used with the subsequent calculation is shown in Table 1.

TABLE 1

| Previously selected calculation equation | $Th_0$ | $Th_1$ | $Th_2$ | $Th_3$ |
|---|---|---|---|---|
| (1) | $Th_0 - dTh_0$ | $Th_1 + dTh_1$ | $Th_2 + dTh_2$ | $Th_3 + dTh_3$ |
| (2) | $Th_0 + dTh_0$ | $Th_1 - dTh_1$ | $Th_2 - dTh_2$ | $Th_3 + dTh_3$ |
| (3) | $Th_0 + dTh_0$ | $Th_1 - dTh_1$ | $Th_2 + dTh_2$ | $Th_3 + dTh_3$ |
| (4) | $Th_0 + dTh_0$ | $Th_1 + dTh_1$ | $Th_2 - dTh_2$ | $Th_3 - dTh_3$ |
| (5) | $Th_0 + dTh_0$ | $Th_1 + dTh_1$ | $Th_2 - dTh_2$ | $Th_3 + dTh_3$ |
| (6) | $Th_0 + dTh_0$ | $Th_1 + dTh_1$ | $Th_2 + dTh_2$ | $Th_3 - dTh_3$ |
| (7) | $Th_0 + dTh_0$ | $Th_1 + dTh_1$ | $Th_2 + dTh_2$ | $Th_3 + dTh_3$ |

The threshold values $Th_0$ to $Th_3$ and the correction amounts $dTh_0$ to $dTh_3$ take the following values for example:
$Th_0 = 3.0$ EV, $Th_1 = 0.5$ EV, $Th_2 = 0.75$ EV, $Th_3 = 0.5$ EV, $dTh_0 = 0.1$ EV, $dTh_1 = 0.05$ EV, $dTh_2 = 0.15$ EV, $dTh_3 = 0.1$ EV.

Assuming that the calculation equation (5) was selected previously, the threshold values to be used at the present calculation are given by:

$Th_0 = 3.1$ EV, $Th_1 = 0.55$ EV, $Th_2 = 0.60$ EV, $Th_3 = 0.6$ EV.

The calculation control unit 26 reads the threshold values $Th_0$ to $Th_3$ set in the above manner from the threshold value setting unit 21, and compares at judgment step J10 the value $|D_0|$ with the threshold value $Th_0$. If the conditional formula $|D_0| > Th_0$ is satisfied, it means that the present luminance of the image frame is greatly different from the target value Ref, for example, in the case immediately after the power is supplied to the video camera 2, or in the case where the scene is panned from a dark room to an outdoor bright scene. In such a case, calculating the scene luminance value after the scene discrimination takes a long time, because the feedback control of the iris diaphragm 5 to restore a stable position takes a long time. In order to shorten the time, the main object is assumed to be located within the hatched portion indicated in FIG. 8A, and the calculation equation (1) is selected to obtain the scene luminance value $C_1$.

Figure 8A:
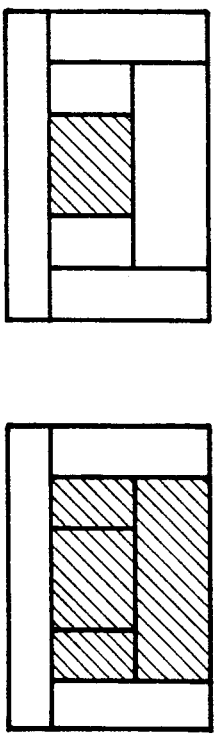
FIGS. 8A to 8G illustrate the patterns of various scenes.
Figure 8B:
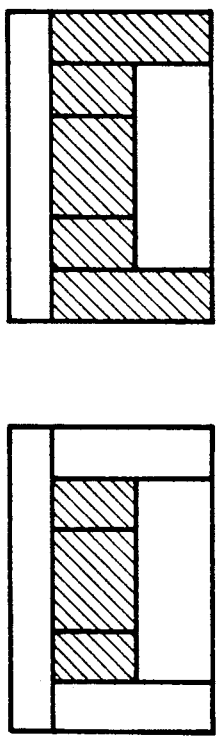
Figure 8C:
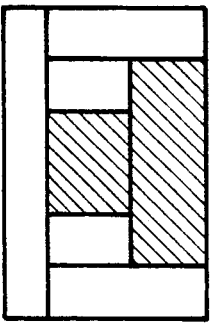

If the conditional formula $|D_0| \geq Th_0$ is not satisfied at judgement step J10, the value $|D_1|$ is compared with the threshold value $Th_1$ at judgement step J11. If $|D_1| \geq Th_1$, then the main object such as the face of the object is considered as locating within the area $S_1$. In this case, the value $|D_2|$ is compared with the threshold value $Th_2$ at judgment step J12. If $|D_2| \geq Th_2$, it means that there is a luminance difference between the face and clothes. Therefore, the calculation equation (2) is selected to calculate the scene luminance value $C_2$, which emphasizes the area $S_1$ within which the face is assumed to be located as shown in FIG. 8B. On the other hand, if not $|D_2| \geq Th_2$, it means that there is little luminance difference between the face and clothes of the object. Therefore, the calculation equation (3) is selected to calculate the scene luminance value $C_3$, which emphasizes the average luminance value $B_{12}$ of the areas $S_1$ and $S_2$ as shown in FIG. 8C.

Figure 8D:
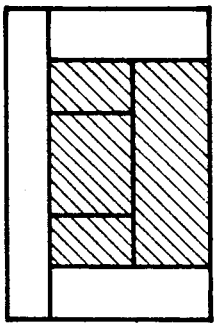

If $|D_1| \geq Th_1$ is not true, it means that there is no luminance difference between the areas $S_1$ and $S_3$. In this case, the value $|D_2|$ is compared with the threshold value $Th_2$ at judgement step J13. If $|D_2| \geq Th_2$, it means that there is no luminance difference between the areas $S_1$ and $S_3$ and some luminance difference between the areas $S_1$ and $S_2$. It is therefore judged at judgement step J14 whether or not $|D_3| \geq Th_3$. If $|D_3| \geq Th_3$, there is a difference between the average luminance value $B_{13}$ of the areas $S_1$ and $S_3$ and the average luminance value $B_4$ of the area $S_4$. Therefore, the calculation equation (4) is selected to calculate the scene luminance value $C_4$, which emphasizes the average luminance value $B_{13}$ of the areas $S_1$ and $S_3$ as shown in FIG. 8D.

Figure 8E:
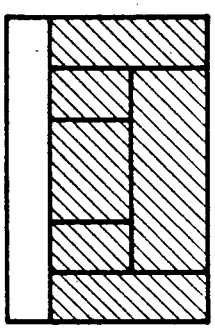

If $|D_3| \geq th_3$ is not true, it means that there is no difference between the average luminance value $B_{13}$ of the areas $S_1$ and $S_3$ and the average luminance value $B_4$ of the area $S_4$ as shown in FIG. 8E. Therefore, the calculation equation (5) is selected to calculate the scene luminance value $C_5$, which emphasizes the average luminance value $B_{134}$ of the areas $S_1$, $S_3$ and $S_4$.

Figure 8F:
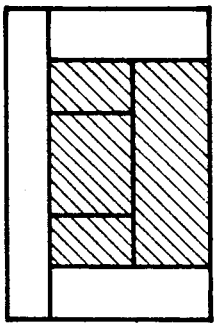
Figure 8G:

If $|D_0 \geq Th_0$, $|D_1| \geq Th_1$, $|D_2| \geq Th_2$ are not true, it means that there is no luminance difference among the areas $S_1$, $S_2$ and $S_3$, and that the average luminance value $B_{123}$ of the areas $S_1$, $S_2$ and $S_3$ takes a value near the target value Ref. Therefore, in this case, it is judged whether $|D_3| \geq Th_3$ at judgement step J15. If $|D_3| \geq Th_3$, the calculation equation (6) is selected to calculate the scene luminance value $C_6$, which emphasizes $S_{123}$ as shown in FIG. 8F. If $|D_3| \geq Th_3$ is not true, it means that there is no luminance difference among the areas $S_1$, $S_2$, $S_3$ and $S_4$ as shown in FIG. 8G, so that the calculation equation (7) is selected to calculate the scene luminance value $C_7$.

In the above manner, a scene discrimination is conducted using the above-described conditional formulas, and the scene luminance value $C_i$ is calculated using the calculation equation selected for a particular scene. Thereafter, as described above, the iris diaphragm 5 is adjusted in accordance with the calculated scene luminance value $C_i$. The calculation sequence for the scene luminance value is executed at the time interval of 1 second for example. The threshold setting unit 21 sets the threshold values $Th_0$ to $Th_3$ in accordance with the type of calculation equation selected one time interval before, by using the conversion Table 1.

In the second embodiment illustrated in FIGS. 4 to 8, the luminance data of the high luminance components are clipped so as to avoid exceeding 100 IRE by using one clip level. The reason for this is as follows: A rear light scene generally has an average luminance in the order of 20 IRE for a human object, and in the order of 120 IRE for a background thereof. For the output signal of the gamma 1.0 series for example, if the high luminance components are suppressed to 100 IRE, then the average luminance value of a rear light scene is lowered. The average value calculated through weighted addition comes near to the average luminance value of a human object, thereby making the exposure control easy to be processed. On the other hand, in the case of a spot light scene, if the clip level for the high luminance components is raised, then the average value calculated through weighted addition comes near to the average luminance value of a human object, thereby also making the exposure control easy to be processed.

Figure 9:
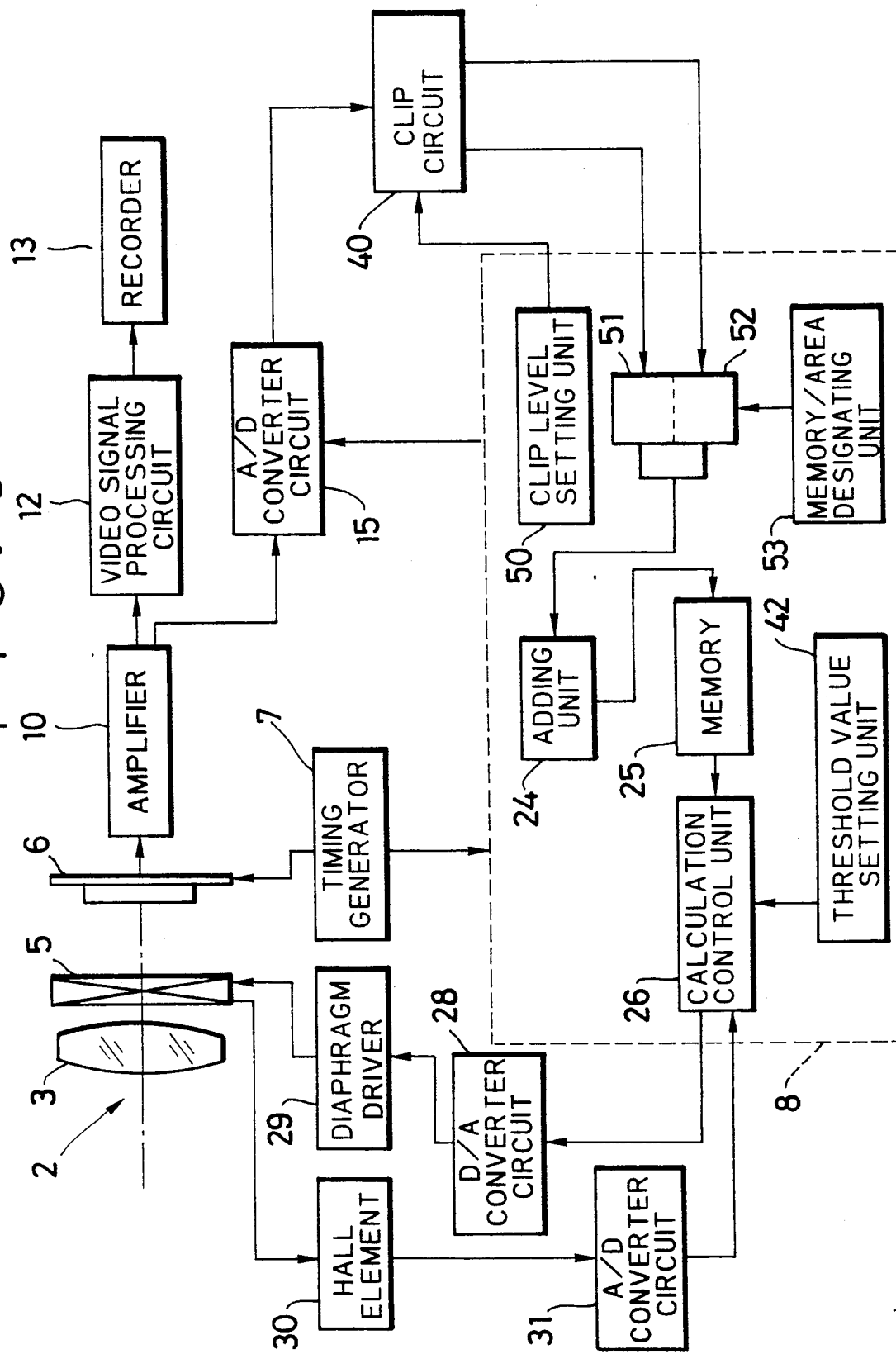
FIG. 9 is a block diagram showing a video camera according to a third embodiment of this invention.
Figure 10:
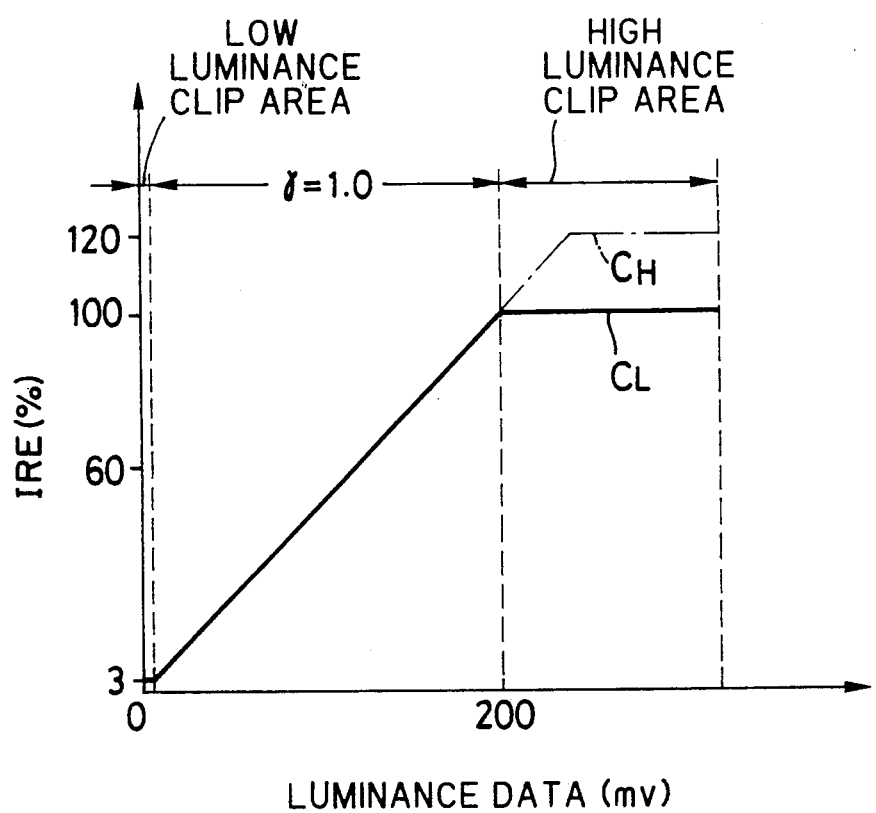
FIG. 10 is a graph showing the characteristic of the clip circuit.
Figure 11:
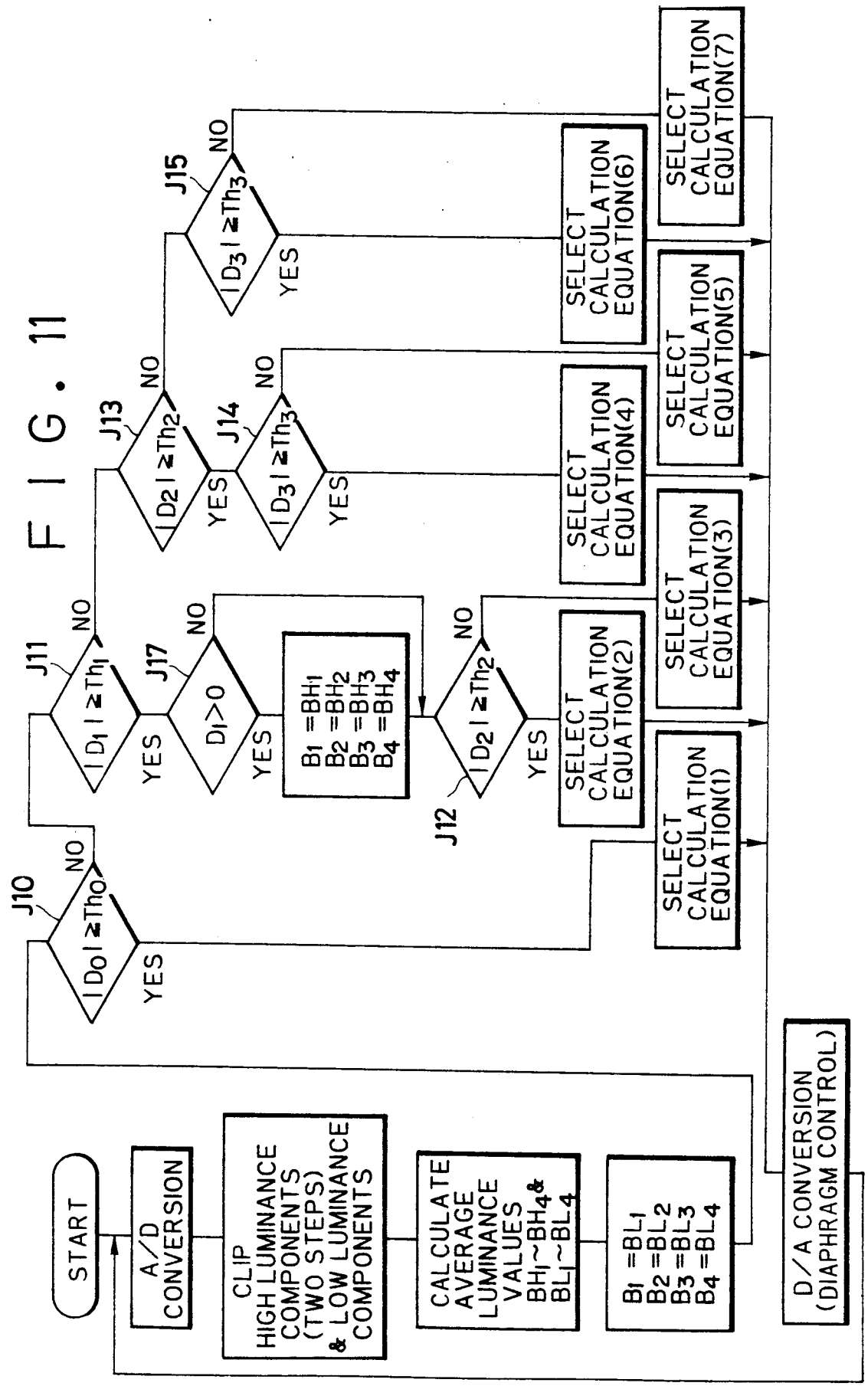
FIG. 11 is a flow chart illustrating the photometry procedure for the embodiment shown in FIG. 9.

FIGS. 9 to 11 illustrate another embodiment wherein the high luminance components are clipped using two clip levels. A clip level setting circuit 50 sets the clip level for the high luminance components to $C_L$ and $C_H$ as shown in FIG. 10. The clip level $C_L$ suppresses the high luminance components higher than 100 IRE to 100 IRE, whereas the clip level $C_H$ suppresses the high luminance components higher than 120 IRE to 120 IRE. The clipping process for the low luminance components is also carried out to clip the low luminance components lower than 3 IRE to 3 IRE.

The clip circuit 40 causes the luminance data of one frame to undergo the gamma conversion (e.g., gamma=1), and performs two steps of clipping the high luminance components. The luminance data of one frame clipped at the clip level $C_L$ are written in a frame memory 51, whereas those clipped at the clip level $C_H$ are written in a frame memory 52. A memory/area designating unit 53 designates the frame memory 51 to read the stored luminance data of each area, and sends the read-out data to the adding unit 24. The adding unit 24 calculates the average luminance values $BL_1$ to $BL_4$ for respective areas by using the luminance data clipped at the clip level $C_L$, and writes them in the memory 25. Next, the area/memory designating unit 53 designates the frame memory 52 to read the stored luminance data for each area. The luminance data clipped at the clip level $C_H$ are used for calculating the average luminance values $BH_1$ to $BH_4$ which are written in the memory 25.

The calculation control unit 26 selectively uses the two types of average luminance values for the scene discrimination and scene luminance value calculation, by using the same conditional formulas and scene luminance value calculation equations as the second embodiment. The clip level $C_H$ is effective for a spot light scene so that the average luminance values $BL_1$ to $BL_4$ are used only for a spot light scene. At judgement steps J10, J11 and J13 to J15 and in the calculation equations (1) and (4) to (7), the average luminance values $BL_1$ to $BL_4$ read from the memory 25 are used as the average luminance values $B_1$ to $B_4$ as in the following:

$B_1=BL_1, B_2=BL_2, B_3=BL_3, B_4=BL_4$

On the other hand, if the conditional formula $|D_1|>0$ is satisfied at judgement step J17, it is considered as a spot light scene. In this case, the average luminance values $BL_1$ to $BL_4$ are read from the memory 25 and used as the average luminance values $B_1$ to $B_4$ as in the following:

$B_1=BH_1, B_2=BH_2, B_3=BH_3, B_4=BH_4$

These average luminance values $BH_1$ to $BH_4$ are used in calculating the luminance difference $D_2$, and at judgement step J12 it is judged whether $|D_2|\geq Th_2$ is satisfied or not. If satisfied, the calculation equation (2) is selected. If not satisfied, the calculation equation (3) is selected. The average luminance values $BH_1$ to $BH_4$ are used for the calculation equations (2) and (3).

On the other hand, if the conditional formula is not satisfied at step J17, it is considered as a rear light scene.

In this case, using the luminance difference $D_2$ obtained from the average luminance values $BL_1$ to $BL_4$, judgement step J12 is executed. With this judgement result, the calculation equation (2) or (3) is selected, and the average luminance values $BL_1$ to $BL_4$ are also used for the calculation equation (2) or (3).

The third embodiment is the same as the second embodiment except that the average luminance values $BH_1$ to $BH_4$ are used only for the spot light scene. The threshold values $Th_0$ to $Th_3$ and the correction amounts $dTh_0$ to $dTh_3$ may use the same values as the second embodiment, or may use the following values:

$Th_0=2.0$ EV, $Th_1=0.9$ EV, $Th_2=0.9$ EV, $Th_3=0.5$ EV, $dTh_0=0.1$ EV, $dTh_1=0.1$ EV, $dTh_2=0.1$ EV, $dTh_3=0.05$ EV.

In the above embodiments, the exposure control for a video camera which continuously picks up scenes, has been described. This invention is also applicable to an electronic still camera having a continuous imaging mode. Further, although two types of clipping processes are conducted for the same image frame, such clipping processes may be carried out for two consecutive image frames. Furthermore, the clipping process may be performed by the microcomputer 8. In this case, the luminance data of one frame are written in the frame memory as they are, and the read-out luminance data are subjected to the clipping process and sent to the adding unit 24. With such an arrangement, a single frame memory may suffice in the third embodiment shown in FIG. 9. Still further, instead of deriving the luminance signal from the amplifier 10, it may be derived from the video signal processing circuit 12 and supplied to the A/D converter circuit 15.

Although the present invention has been fully described in connection with the preferred embodiments thereof with reference to the accompanying drawings, it will be apparent to those skilled in the art that various changes and modifications of the present invention are possible within the scope of the following claims.

I claim:

1. An exposure control method comprising the steps of:
   performing a multi-point photometry of a scene to be imaged with an image area sensor;
   dividing said scene into a plurality of areas and calculating an average luminance value of each of said areas;
   obtaining a difference between average luminance values of said plurality of areas, and comparing said difference with a threshold value to discriminate a type of scene;
   selecting a calculation equation prepared for each type of scene in accordance with said discrimination of said scene, and calculating a luminance value of said scene by using at least one of said average luminance values; and
   driving exposure control means in accordance with said scene luminance value.

2. The exposure control method according to claim 1, said exposure control means is an iris diaphragm.

3. The exposure control method according to claim 2, said image area sensor is positioned at the focal plane of a taking lens and is used in performing a photometry for the exposure control and imaging.

4. An exposure control method comprising the steps of:
  performing a photometry of each pixel of a scene to be imaged by using a signal outputted from an image area sensor positioned at the focal plane of a taking lens;
  dividing said scene into a central area and a peripheral area, calculating a first average luminance value using luminance values of respective pixels within said central area, and calculating a second average luminance value using luminance values of respective pixels within said peripheral area;
  calculating a luminance difference between said first and second average luminance values;
  comparing said luminance difference with a threshold value to discriminate whether said scene is a normal scene, rear light scene, or spot light scene, wherein said scene is discriminated as said normal scene if said luminance difference is smaller than said threshold value, said scene is discriminated as said rear light scene if said first average luminance value is smaller than said second average luminance value and said luminance difference is equal to or larger than said threshold value, and said scene is discriminated as said spot light scene if said first average luminance value is larger than said second average luminance value and said luminance difference is equal to or larger than said threshold value;
  in the case of said rear light scene, obtaining a median between said first and second average luminance values, selecting only luminance values smaller than said median from luminance values of said respective pixels, and obtaining a third average luminance value by a selection of said luminance values, and in the case of said spot light scene, selecting only luminance values larger than said median from luminance values of said respective pixels, and obtaining a fourth average luminance value by a selection of said luminance values;
  selecting said first average luminance value for said normal scene, said third average luminance value for said rear light scene, or said fourth average luminance value for said spot light scene; and
  driving exposure control means by using said selected one of said first, third or fourth average luminance values as a luminance value of said scene, and adjusting the light amount incident to said image area sensor.

5. The exposure control method according to claim 4, further comprising the steps of:
  in the case of said rear light scene and said spot light scene, obtaining average luminance values of said central area and said peripheral area by using said luminance values selected with reference to said median; and
  obtaining a new median if a luminance difference between said central and peripheral average luminance values is equal to or larger than said threshold value, and selecting again luminance values using said new median as a reference value.

6. The exposure control method according to claim 5, said exposure control means is an iris diaphragm disposed between said taking lens and said image area sensor.

7. The exposure control method according to claim 6, said third and fourth average luminance values are the average luminance value of said central area.

8. The exposure control method according to claim 6, said third and fourth average luminance values are the average luminance value of the whole area of said scene.

9. An exposure control apparatus for use with a video camera which takes a scene with an image area sensor positioned at the focal plane of a taking lens, comprising:
  a frame memory for storing signals of one frame outputted from the image area sensor;
  means for reading said signals from said frame memory from a central area and a peripheral area separately within said scene;
  means for obtaining a first average luminance value by using said signals from said central area, and obtaining a second average luminance value by using said signals from said peripheral area;
  means for discriminating whether said scene is a normal scene, rear light scene or spot light scene by comparing a luminance difference between said first and second average luminance values with a threshold value, said discriminating means discriminating said scene as said normal scene if said luminance difference is smaller than said threshold value, discriminating said scene as said rear light scene if said first average luminance value is smaller than said second average luminance value and said luminance difference is equal to or larger than said threshold value, and discriminating said scene as said spot light scene if said first average luminance value is larger than said second average luminance value and said luminance difference is equal to or larger than said threshold value;
  means for calculating a third average luminance value for said rear light scene and a fourth average luminance value for said spot light scene, wherein a median between said first and second average luminance values is obtained, only luminance values smaller than said median are selected from luminance values of respective pixels of said scene for the calculation of said third average luminance value, and only luminance values larger than said median are selected from luminance values of said respective pixels for the calculation of said fourth average luminance value;
  means for selecting said first average luminance value for said normal scene, said third average luminance value for said rear light scene, or said fourth average luminance value for said spot light scene, respectively as a luminance value of said scene; and
  an iris diaphragm for adjusting the light amount incident to said image area sensor in accordance with the selected said luminance value of said scene.

10. An exposure control method for controlling an exposure in accordance with a scene luminance value, comprising the steps of:
  performing a photometry of respective pixels of a scene to be imaged by using signals from an image area sensor positioned at the focal plane of a taking lens;
  dividing said scene into a plurality of areas, and calculating a plurality of average luminance values using the luminance values of respective pixels within said plurality of areas;
  obtaining luminance differences between said plurality of average luminance values of said areas;
  comparing said luminance differences with corresponding threshold values to perform a scene discrimination, said threshold values being changed in accordance with the type of scene discriminated at a scene discrimination preceding said scene discrimination; and selecting a calculation equation in accordance with the type of scene discriminated during a present scene discrimination, and determining said scene luminance value.

11. The exposure control method according to claim 10, further comprising a step of clipping the high luminance components of said signals selectively at a first clip level for a rear light scene and at a second clip level higher than said first clip level for a spot light scene.

12. The exposure control method according to claim 10, each of said threshold values takes a value obtained by adding/subtracting a correction amount determined by said preceding scene discrimination to/from a predetermined value.

13. The exposure control method according to claim 11, an iris diaphragm is disposed between said taking lens and said image area sensor, said iris diaphragm being adjusted in accordance with said scene luminance value.

14. The exposure control method according to claim 13, said plurality of areas include five areas.

15. An exposure control apparatus for use with a video camera which takes a scene with an image area sensor positioned at the focal plane of a taking lens comprising:

means for clipping the high luminance components of signals outputted from said image area sensor at a first clip level and at a second clip level higher than said first clip level;

means for calculating an average luminance value of each of the divisional areas of said scene by using said clipped signals;

means for performing a discrimination of said scene by checking the luminance distribution of said scene while referring to said average luminance value of each area, and selecting a calculation equation prepared for each discriminated scene to calculate a luminance value of said scene;

means for calculating said average luminance value by using said signals clipped at said second clip level if said scene discrimination discriminates said scene as a spot light scene with a high luminance at a central area of said scene; and means for driving exposure control means in accordance with said scene luminance value, and adjusting the light amount incident to said image area sensor.

16. The exposure control apparatus according to claim 15, said exposure control means is an iris diaphragm disposed between said taking lens and said image area sensor.

* * * * *